United States Patent
Luo et al.

(10) Patent No.: US 9,240,722 B2
(45) Date of Patent: Jan. 19, 2016

(54) METHODS AND SYSTEMS FOR IMPROVING LIGHT LOAD EFFICIENCY FOR POWER STAGES OF MULTI-PHASE VOLTAGE REGULATOR CIRCUITS

(71) Applicants: Shiguo Luo, Austin, TX (US); Kejiu Zhang, Round Rock, TX (US); Hang Li, Austin, TX (US)

(72) Inventors: Shiguo Luo, Austin, TX (US); Kejiu Zhang, Round Rock, TX (US); Hang Li, Austin, TX (US)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 14/470,344

(22) Filed: Aug. 27, 2014

(65) Prior Publication Data

US 2015/0372597 A1 Dec. 24, 2015

Related U.S. Application Data

(60) Provisional application No. 62/014,460, filed on Jun. 19, 2014.

(51) Int. Cl.
*G06F 1/32* (2006.01)
*H02M 3/158* (2006.01)
*G06F 1/26* (2006.01)
*H02M 3/156* (2006.01)

(52) U.S. Cl.
CPC ............... *H02M 3/1584* (2013.01); *G06F 1/26* (2013.01); *G06F 1/32* (2013.01); *H02M 2003/1586* (2013.01)

(58) Field of Classification Search
CPC ... H02M 3/156; H02M 3/158; H02M 3/1584; H02M 3/1588; H02J 1/102; Y02B 70/1458; Y02B 70/1466

USPC .......... 713/320, 324; 323/271, 272, 282, 284, 323/351

See application file for complete search history.

(56) References Cited

U.S. PATENT DOCUMENTS

| | | | |
|---|---|---|---|
| 7,999,520 | B2 | 8/2011 | Luo et al. |
| 8,125,200 | B2 | 2/2012 | Tsai et al. |
| 8,957,658 | B2 * | 2/2015 | Nakamura ............... H02M 1/08 323/284 |
| 9,000,786 | B2 | 4/2015 | Luo et al. |
| 2006/0190532 | A1 | 8/2006 | Chadalavada |
| 2006/0212143 | A1 | 9/2006 | Nguyen et al. |
| 2010/0277151 | A1 | 11/2010 | Tsai et al. |
| 2012/0275610 | A1 | 11/2012 | Lambert et al. |

(Continued)

OTHER PUBLICATIONS

Rahardjo et al., "Systems and Methods of Current Sense Calibration for Voltage Regulator Circuits", U.S. Appl. No. 14/449,949, filed Aug. 1, 2014, 43 pgs.

(Continued)

*Primary Examiner* — Gary L Laxton
(74) *Attorney, Agent, or Firm* — Egan, Peterman, & Enders LLP

(57) ABSTRACT

Methods and systems are disclosed that may be employed to improve efficiency of smart integrated power stages (IPstages) of multi-phase VR systems while operating under relatively light, ultra-light, or partial or reduced loads. The disclosed methods and systems may be implemented to improve VR system light load efficiency by providing and enabling reduced power IPstage operating modes in one or more smart IPstage/s of a VR system, and by enabling state transition between IPstage active and reduced power operating modes such as IPstage standby and IPstage hibernation modes.

21 Claims, 8 Drawing Sheets

(56) References Cited

U.S. PATENT DOCUMENTS

| | | |
|---|---|---|
| 2012/0324246 A1 | 12/2012 | Rahardjo et al. |
| 2013/0207630 A1 | 8/2013 | Rahardjo et al. |
| 2013/0318371 A1 | 11/2013 | Hormuth |
| 2014/0082236 A1 | 3/2014 | Zhang et al. |
| 2014/0232420 A1 | 8/2014 | Luo et al. |
| 2015/0188425 A1* | 7/2015 | Chang .................. H02M 3/158 323/271 |

OTHER PUBLICATIONS

System Power States, Printed From Internet Aug. 25, 2014, 2 pgs.

Intel, "$2^{nd}$ Generation Intel Core Processor Family Mobile With ECC", Datasheet Addendum, May 2012, 42 pgs.

Richards et al., "Calibration of Voltage Regulator", U.S. Appl. No. 14/334,122, filed Jul. 17, 2014, 32 pgs.

Luo et al., "Methods and Systems for Calibration of Voltage Regulator Systems with Multiple Types of Power Stages", U.S. Appl. No. 14/470,217, filed Aug. 27, 2014, 38 pgs.

Luo et al., "Methods and Systems for Implementing Adaptive Fet Drive Voltage Optimization for Power Stages of Multi Phase Voltage Regulator Circuits", U.S. Appl. No. 14/470,455, filed Aug. 27, 2014, 36 pgs.

* cited by examiner

METHODS AND SYSTEMS FOR IMPROVING LIGHT LOAD EFFICIENCY FOR POWER STAGES OF MULTI-PHASE VOLTAGE REGULATOR CIRCUITS

This application claims the benefit of U.S. Provisional Patent Application Ser. No. 62/014,460, filed on Jun. 19, 2014 and entitled "Methods And Systems For Improving Light Load Efficiency For Power Stages Of Multi-Phase Voltage Regulator Circuits", which is incorporated herein by reference in its entirety for all purposes.

The present application is related in subject matter to concurrently filed patent application Ser. No. 14/470,217 entitled "METHODS AND SYSTEMS FOR CALIBRATION OF VOLTAGE REGULATOR SYSTEMS WITH MULTIPLE TYPES OF POWER STAGES" by Luo et al., and to concurrently filed patent application Ser. No. 14/470,455 entitled "METHODS AND SYSTEMS FOR IMPLEMENTING ADAPTIVE FET DRIVE VOLTAGE OPTIMIZATION FOR POWER STAGES OF MULTI-PHASE VOLTAGE REGULATOR CIRCUITS" by Luo et al. which is incorporated herein by reference in its entirety.

FIELD OF THE INVENTION

This application relates to information handling systems, and more particularly to power stages for multi-phase voltage regulator (VR) circuitry.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

High current information handling system loads, such as for CPU's and memory, typically require multi-phase voltage regulators (VR's). An integrated power stage (IPstage) of each VR phase is an integrated circuit that is usually composed of a MOSFET (metal oxide semiconductor field effect transistor) driver, a high-side MOSFET, and a low-side MOSFET. FIG. 2 illustrates a block diagram of a conventional smart IPstage 250. IPstage 250 includes modules that consume power when a VR system is lightly or very lightly loaded. These modules include driver logic module 252, high frequency current sense/calibration module 254, and half-bridge power MOSFETs module 256 (including high side and low side FETs). In addition to an IPstage, a VR phase also usually includes an inductor with all the phase inductors being tied together at their output. One example of a multi-phase VR architecture may be found in U.S. Pat. No. 7,999,520.

Servers are a type of information handling system that is requiring ever increasing accuracy for power telemetry data to be used in system level power and thermal management algorithms. Modern design of servers and other types of information handling systems requires accurate load current reporting in real-time manner as well as good light load power efficiency. Current sense accuracy directly impacts system performance, power saving and reliability. Inductor direct current resistance (DCR) sense has been widely used in power industry for many years. One possible approach on improving accuracy is to use integrated smart power stage (SPS or IPstage) with RDS(on) current-sensing and calibration. Smart IPstages and other changes in multi-phase VR system designs to meet changing requirements for current sense accuracy bring complexity to the power stage and thus induce higher quiescent current demand in IPstage module.

SUMMARY OF THE INVENTION

Disclosed herein are methods and systems that may be employed to improve efficiency of smart IPstages of multi-phase VR systems while operating under relatively light, ultra-light, or partial or reduced loads. In one exemplary embodiment, the disclosed methods and systems may be implemented to improve VR system light load efficiency by providing and enabling reduced power IPstage operating modes in one or more smart IPstage/s of the VR system, and by enabling state transition between IPstage active and reduced power operating modes. Examples of such reduced power IPstage operating modes include, but are not limited to, IPstage standby and/or IPstage hibernate modes. Such reduced power IPstage operating modes may be particularly useful for smart IPstages that include features (e.g., such as integrated or embedded current-sense with larger sense signal, higher power density/efficiency, and/or calibration features) which serve to increase VR system efficiency during active IPstage and VR system operating modes, but which require high current amplifier bandwidth and consume more quiescent current (e.g., about 15 mA) per phase when the system operates in information handling system standby modes such as Advanced Configuration and Power Interface (ACPI) modes S3, S4 and S5. This additional power consumption during system standby modes translates to extra current draw and extra power loss (e.g., in total of about 1500 mWatts) for a main-stream server.

In one embodiment, an IPstage standby mode may be implemented in a case where at least a portion of the multiple IPstage phases of a VR system are in an inactive status for a relatively long period of time such as in cases of a light load operation condition or a low microprocessor power state (e.g., PS1, PS2) mode. In such an embodiment, a standby mode may be implemented for a given IPstage after the given IPstage has been inactive for a period of time that meets or exceeds a pre-defined standby time threshold. In one exemplary embodiment, an IPstage standby mode may be temporarily enabled as one reduced power mode step beyond the phase shedding control in which only power MOSFETs are turned off. In this regard, power savings in an IPstage standby mode may be accomplished, for example, by shutting off the current sensing circuit and/or calibration related sub-circuitry while still maintaining FET driver logic circuitry in active condition so that it is ready to respond quickly to pulse width modulation (PWM) signal/s for VR switching.

In another embodiment, an IPstage hibernation mode may be implemented in a case where at least a portion of the multiple IPstage phases of a VR system are never used unless the system is re-configured, re-initialized, and/or re-started. For example, when supporting a 65 watt central processing unit (CPU) with a six-phase VR system that is capable of supporting a maximum CPU load of twice this amount (130 watts), three IPstage phases of the six-phase VR system may be permanently disabled until and if a larger CPU is installed. Using the disclosed methods and systems, power loss to unused phases may be further reduced by implementing an IPstage hibernate mode for the specific phase IPstage/s which are not needed for optimal VR configuration. Example scenarios for triggering such an IPstage hibernate mode include, but are not limited to, light or overdesigned VR system configuration, ultra-low microprocessor power state (e.g., PS3, PS4) and/or system operation status (e.g., ACPI S3, S4, S5). Power saving in IPstage hibernate mode may be achieved in one embodiment by turning off all logical and FET driving circuits while keeping only enable logic active.

In one respect, disclosed herein is a system including: at least one integrated power stage (IPstage) including an IPstage processing device, power-consuming circuitry, and a power output. The power output of the IPstage may be configured to be coupled to a bootstrap capacitor; and the IPstage may be configured to be coupled to receive signals from a separate processing device configured as a voltage regulator (VR) controller that command the IPstage to selectively provide or not provide power to the power output of the IPstage. The IPstage processing device may be configured to: monitor voltage on the bootstrap capacitor while the IPstage is commanded by a coupled VR controller to not provide power to the power output of the IP stage, enter an IPstage stand-by mode by turning off at least a first portion of the power-consuming circuitry of the IPstage when the monitored voltage of a coupled bootstrap capacitor becomes less than or equal to a pre-determined standby voltage ($V_{standBy}$) threshold value while the IPstage is not providing power to the power output of the IPstage in response to a command from the VR controller, and then exit the stand-by mode by turning on the at least first portion of the power-consuming circuitry of the IPstage when the IPstage receives a command from the VR controller to provide power to the power output of the IPstage.

In another respect, disclosed herein is a method of operating a voltage regulator (VR) system that includes at least one processing device. The method may include: using the at least one processing device as a voltage regulator (VR) controller to control operation of at least one integrated power stage (IPstage) of the VR system, the IPstage having a separate IPstage processing device, power-consuming circuitry, and a power output that is coupled to a bootstrap capacitor; and using the VR controller to provide signals to the IPstage to command the IPstage to selectively provide or not provide power to the power output of the IPstage. The method may further include using the IPstage processing device to: monitor voltage on the bootstrap capacitor while the IPstage is commanded by the VR controller to not provide power to the power output of the IP stage, enter an IPstage stand-by mode by turning off at least a first portion of the power-consuming circuitry of the IPstage when the monitored voltage of a coupled bootstrap capacitor becomes less than or equal to a pre-determined standby voltage ($V_{standBy}$) threshold value while the IPstage is not providing power to the power output of the IPstage in response to a command from the VR controller, and then exit the stand-by mode by turning on the at least first portion of the power-consuming circuitry of the IPstage when the IPstage receives a command from the VR controller to provide power to the power output of the IPstage.

In another respect, disclosed herein is a voltage regulator (VR) system, including: at least one integrated power stage (IPstage) including an IPstage processing device, power-consuming circuitry, and a power output coupled to a bootstrap capacitor; and at least one processing device configured as a VR system controller coupled to control the IPstage to selectively provide or not provide power to the power output of the IPstage. The IPstage processing device may be configured to: monitor voltage on the bootstrap capacitor while the IPstage is controlled by the VR controller to not provide power to the power output of the IP stage, enter an IPstage stand-by mode by turning off at least a first portion of the power-consuming circuitry of the IPstage when the monitored voltage of a coupled bootstrap capacitor becomes less than or equal to a pre-determined standby voltage ($V_{StandBy}$) threshold value while the IPstage is controlled to not provide power to the power output of the IPstage by the VR controller, and then exit the stand-by mode by turning on the at least first portion of the power-consuming circuitry of the IPstage when the IPstage is controlled by the VR controller to provide power to the power output of the IPstage.

DESCRIPTION OF ILLUSTRATIVE EMBODIMENTS

Figure 1:
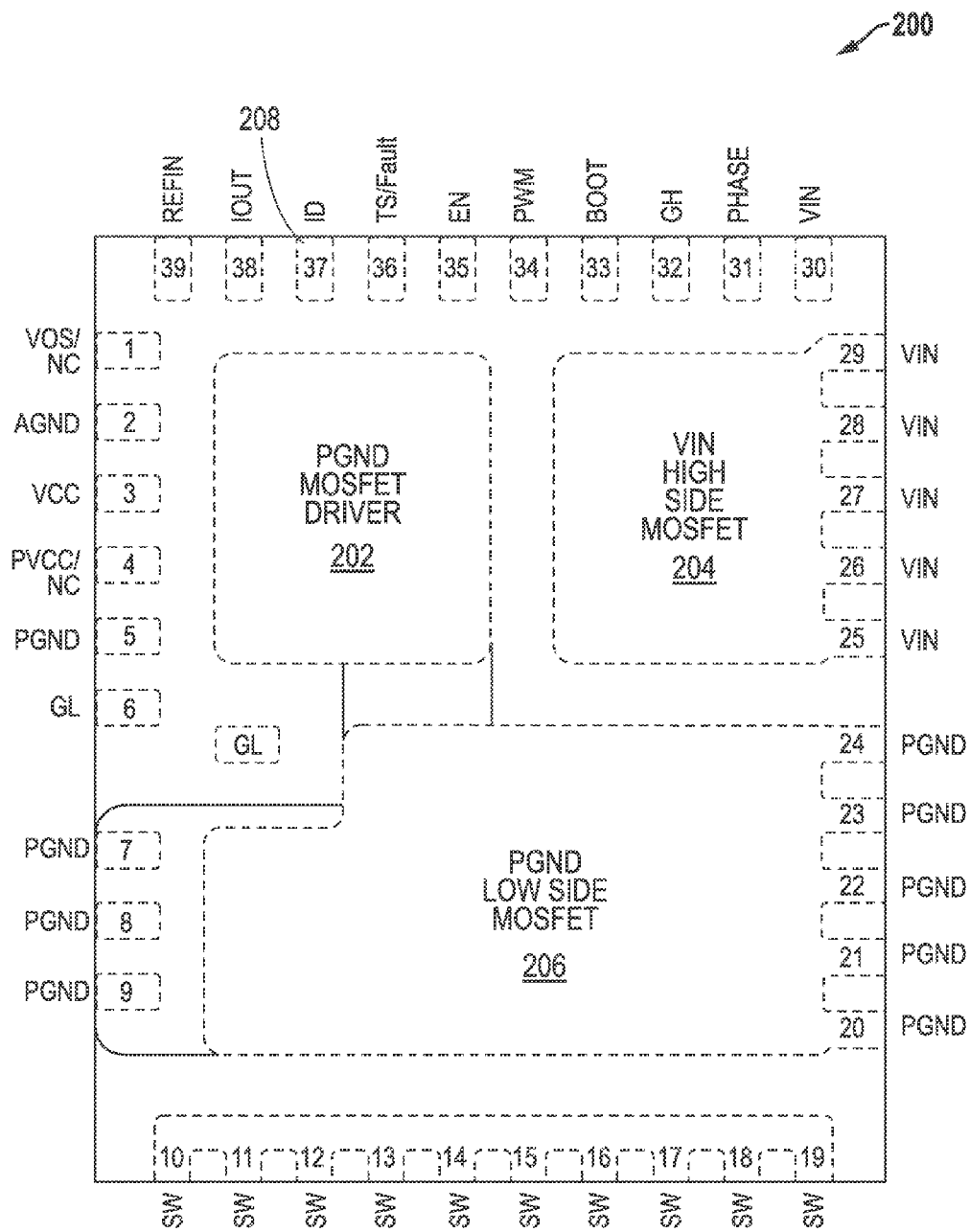
FIG. 1 illustrates a VR smart power stage footprint according to one exemplary embodiment of the disclosed methods and systems.

FIG. 1 illustrates the footprint of a VR smart power stage (IPstage) 200 that may be implemented in one exemplary embodiment of the disclosed methods and systems using MOSFET RDS(on) current sensing calibration with IPstage type identification (e.g., vendor or supplier's ID) recognition. As shown in FIG. 1, IPstage 200 is an integrated circuit chip that includes a MOSFET driver circuit 202, high-side MOSFET circuit 204, and low-side MOSFET circuit 206. As shown, IPstage 200 includes a power device identification pin 208, and in this embodiment MOSFET RDS(on) current-sense, calibration and vendor ID recognition may be integrated in this one IPstage power stage device 200. A smart IPstage may also include integrated processing device logic (e.g., such as a driver logic module 252 of FIG. 5) that is capable of executing one or more tasks of IPstage 200.

Examples of advantages that may be offered by such an IPstage configuration include, but are not limited to, potentially higher efficiency due to reduction of switching/ringing/PCB layout loss and free usage of inductors with lower DCR; more accurate CPU load current monitoring (e.g., such as Intel Imon) due to stronger signal level and embedded calibration; easier printed circuit board (PCB) layout due to more integration and thus higher VR density may be achieved; better noise immunity due to significantly larger signal-noise-ratio and executable logic or algorithm inside the IPstage which may be used to avoid switching noise; and better temperature compensation since internal FET junction temperature may be measured instead of PCB temperature.

Figure 2:
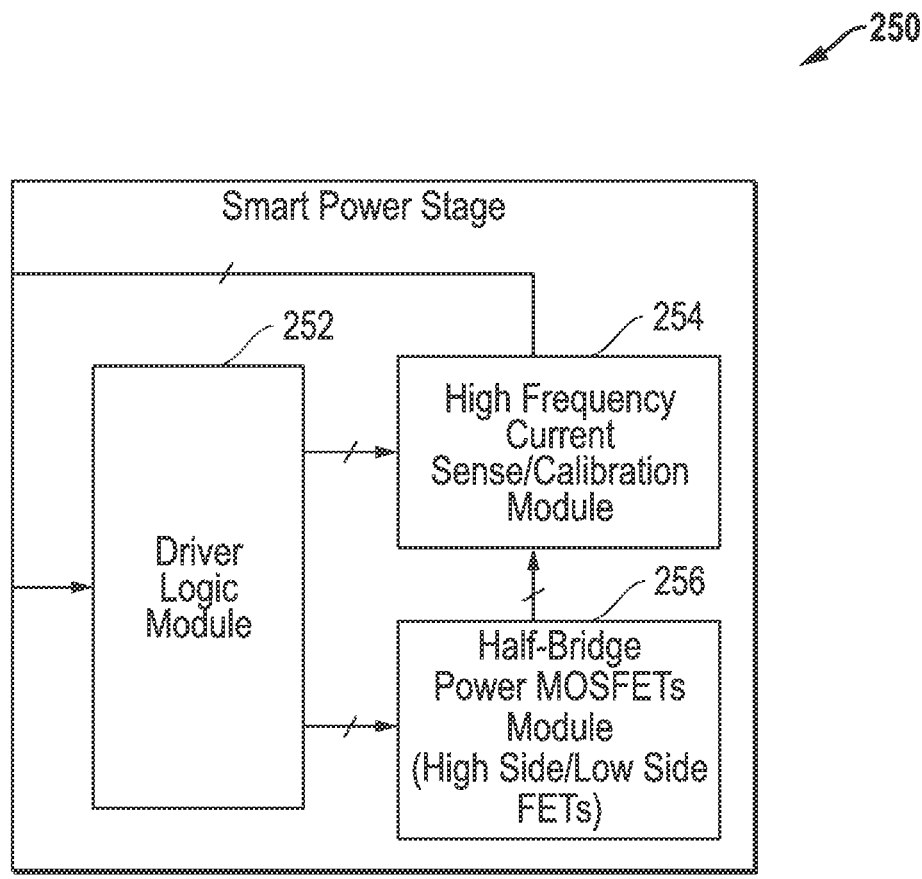
FIG. 2 illustrates a block diagram of a conventional smart power stage.

FIG. 2 illustrates a block diagram of a conventional smart IPstage 250 that is not configured with the disclosed reduced power IPstage operating mode architecture. In this embodiment, IPstage 250 includes modules that consume power when a VR system is lightly or very lightly loaded. These modules include driver logic module 252, high frequency current sense/calibration module 254, and half-bridge power MOSFETs module 256 (including high side and low side FETs).

Figure 3:
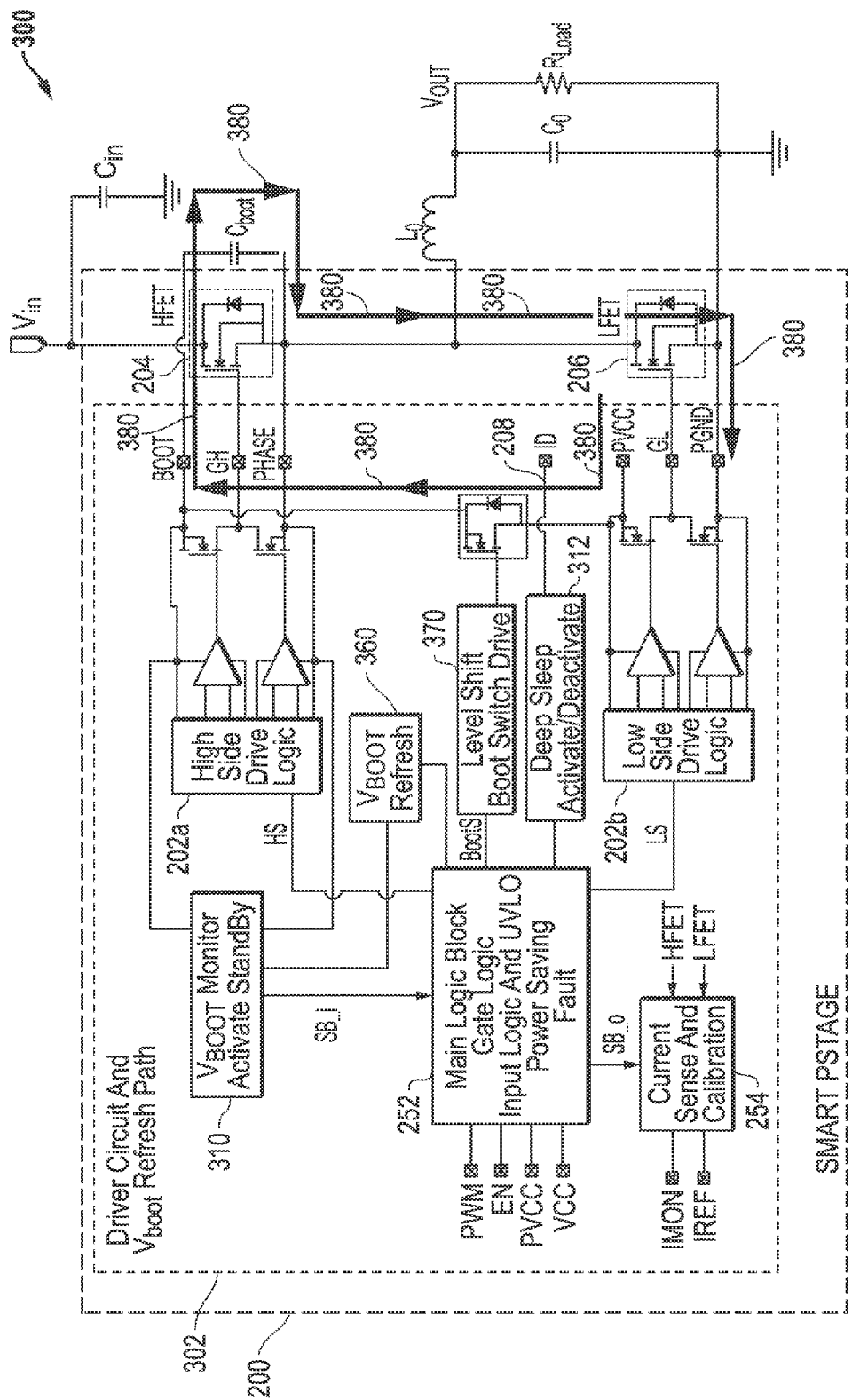
FIG. 3 illustrates a VR configuration according to one exemplary embodiment of the disclosed methods and systems.

FIG. 3 illustrates a typical VR configuration 300 with detailed FET driver block diagram. Supplies VCC and PVCC provide bias supplies for inside control circuit and low-side (LS) MOSFET drive circuitry 202b respectively. As shown, IPstage 200 of FIG. 3 includes a voltage input ($V_{IN}$) to receive input power and a voltage output ($V_{OUT}$) that provides regulated voltage as output power to an electrical load ($R_{LOAD}$) via IPstage power output path that includes output inductor $L_O$ and output capacitor $C_O$ as shown. The bootstrap capacitor (Cboot) supplies the gate charge of high-side (HS) MOSFET 204 and powers the level shift circuitry 370 inside the driver logic circuit 302 which may be at least partially implemented by, for example, an integrated processing device of each IPstage 200. The voltage (Vboot) on the boot capacitor is maintained by being charged when LS FET 206 is turned on.

In this embodiment there is no switching action when the IPstage 200 stays in standby mode corresponding to tri-state of PWM signal, and the bootstrap capacitor is discharged by the leakage current of gate driver circuitry, e.g., implemented by individual MOSFETs shown in FIG. 3 that are coupled to drive the gate (GH) of high side MOSFET HFET and to drive the gate (GL) of low side MOSFET LFET. The voltage on the boot capacitor will continue to drop until the voltage is clamped to the voltage (PVCC-Vsd-Vout), where Vsd is the diode voltage drop across the internal boot switch. The voltage (PVCC-Vsd-Vout) may be below a normal operating bias range, depending on how high the Vout and Vsd are. In such a circumstance, LS FET 206 is needed to turn on with a prescheduled pattern to charge the boot capacitor to maintain the boot voltage (Vboot) within a certain voltage range, as shown by charging current path arrows 380 in FIG. 3. As shown, driver circuit and Vboot refresh path 302 also includes Vboot monitor and standby execution circuit 310 that is configured to monitor Vboot level and to activate IPstage standby mode as further described herein. Driver circuit and Vboot refresh path 302 also includes IPstage deep sleep (or hibernate) mode activation and deactivation circuit 312 that is configured to operate as described further herein.

Figure 4:
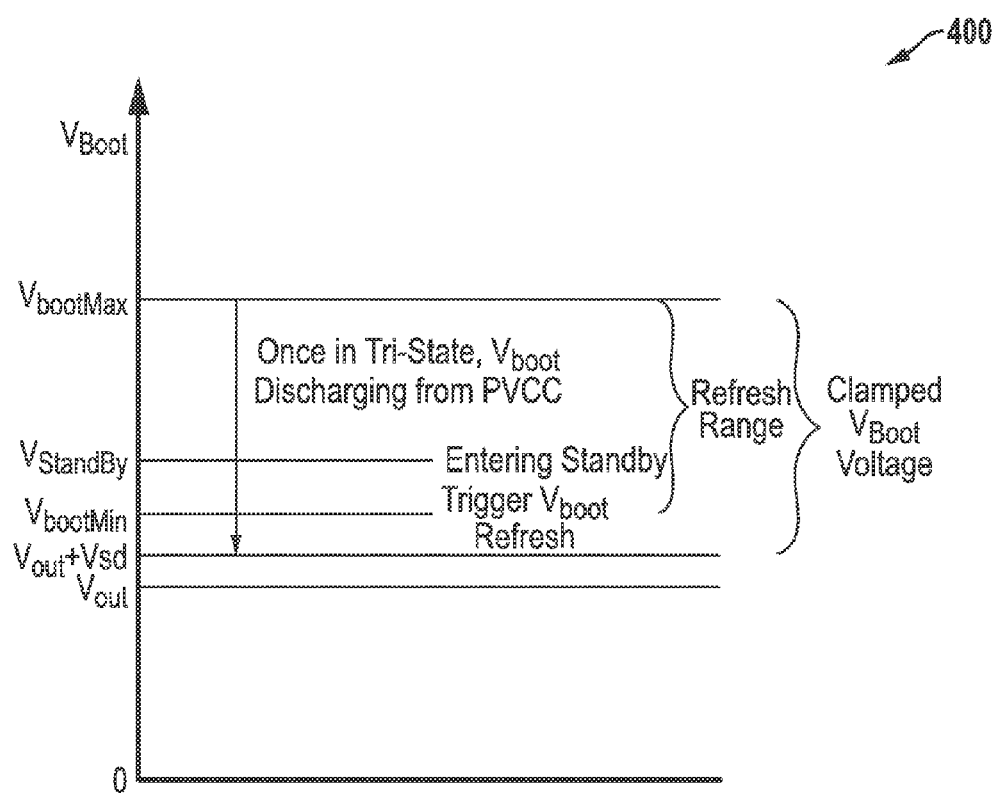
FIG. 4 is a plot of boot voltage levels according to one exemplary embodiment of the disclosed methods and systems.

FIG. 4 is a plot of boot voltage levels illustrating one exemplary embodiment of a boot voltage refresh scheme 400 that may be optionally implemented to prevent occurrence of a short-thru when insufficient Vboot voltage exists, i.e., since a certain level bias is required by HS FET drive shift logic 202a. In this embodiment, if the boot voltage (Vboot) on the boot capacitor is found to be lower than a preset minimum Vboot threshold (VbootMin), the LSFET 206 is pulsed on by boot refresh control circuitry 360. If the boot voltage (Vboot) on the boot capacitor hits a preset maximum threshold (e.g., VbootMax such as PVCC or other suitable value), LSFET is turned off by boot refresh control circuitry 360. In order to reduce negative current in inductor Lo, gate drive pulse width of LSFET 206 may be optionally controlled.

In one embodiment, the voltage level on the boot capacitor inside the FET driver may be used as an indication for an inactive mode of an IPstage phase by allowing the boot capacitor voltage to be maintained in a standby mode that is lower than that of the boot capacitor voltage when the IPstage is operating in a normal operation mode. In this way, it is possible to use the real time Vboot voltage level of a specific IPstage phase to determine whether the IPstage is operating in a standby mode or a dynamic active mode. As shown in FIG. 4, Vboot monitor and standby execution circuit 310 is configured to monitor Vboot and to activate standby IPstage mode when Vboot reaches a standby Vboot threshold (VStandBy), e.g., due to leakage current during tri-state when HSFET 204 and LSFET 206 are both turned off. In order to distinguish standby and normal dynamic operation modes of an IPstage (e.g., CPU step down), the current sense/calibration circuit 254 may not be turned off right after an IPstage phase drop event, e.g., instead may be configured to turn off after a pre-selected time delay period of from about 5 us to about 10 us which represents a few switching cycles, or any suitable shorter or longer time value. Such a time delay period may be selected considering a desired size of timer and/or to achieve quicker transition to standby IPstage mode.

Figure 5:
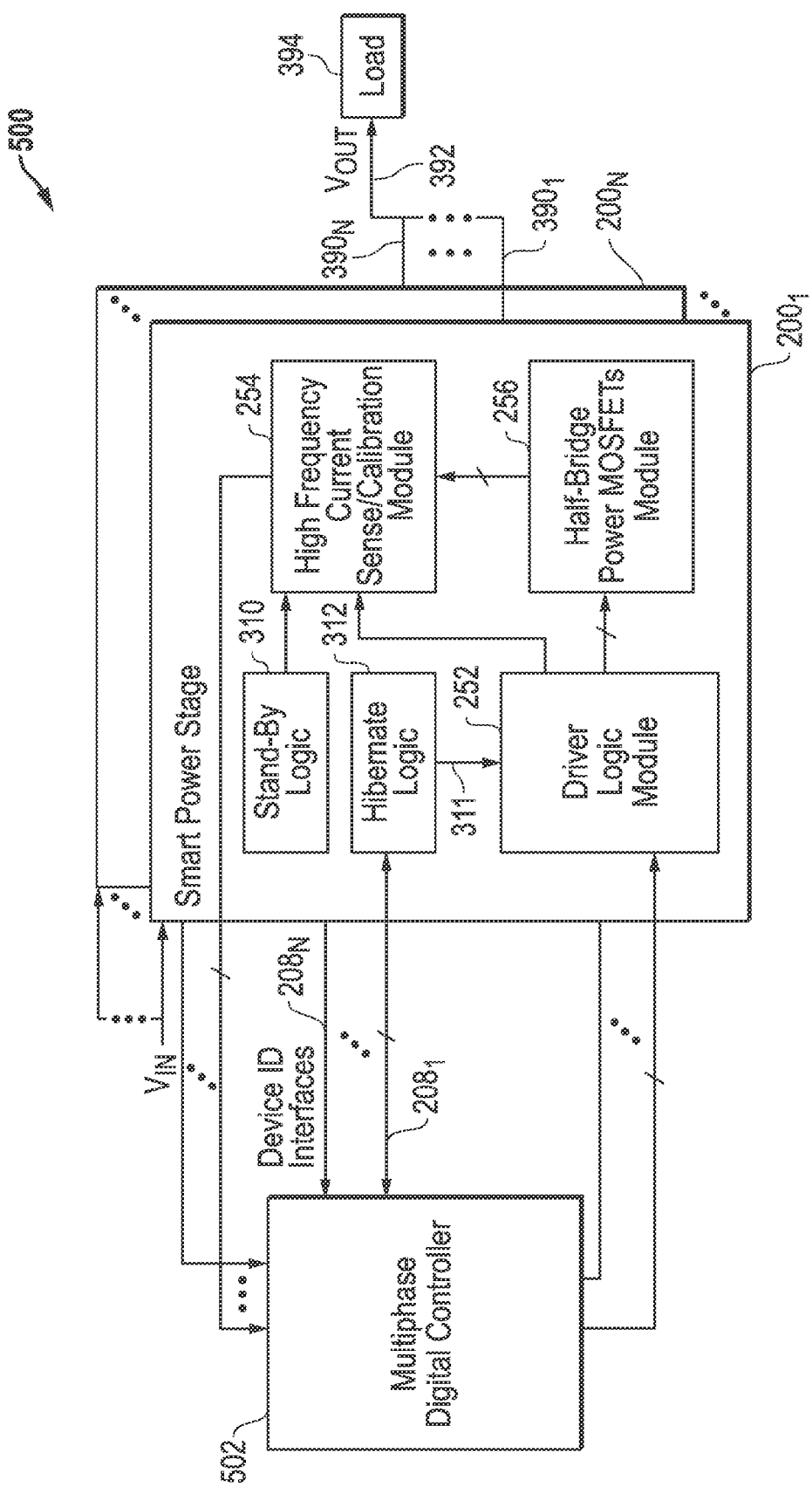
FIG. 5 illustrates a block diagram of a multi-phase VR system according to one exemplary embodiment of the disclosed methods and systems.

FIG. 5 illustrates one exemplary embodiment of a multi-phase VR system 500 as it may be implemented with multiple IPstages $200_1$ to $200_N$ coupled to at least one processing device configured as a digital VR controller 502. As shown in FIG. 5, each IPstage 200 has a high frequency current sense/calibration module 254 and a half-bridge power module 256 that are controlled by driver logic module 252. In this embodiment, half-bridge power module 256 of each given IPstage 200 may be configured to implement high-side MOSFET circuit 204 and low-side MOSFET circuit 206 for that given IPstage 200, while high frequency calibration module 254 of each given IPstage 200 may be configured with current sensing circuitry (e.g., such as MOSFET RDS(on) current-sense circuitry or current mirrors), as well as calibration circuitry such as tuning temperature coupling coefficient, current sense gain and offset circuitry, e.g., such as described in U.S. patent application Ser. No. 14/449,949, filed Aug. 1, 2014, which is incorporated herein by reference in its entirety. Each of IPstages 200 has an individual power output 390 that is coupled to provide output voltage ($V_{OUT}$) and output current from the half-bridge power module 256 to the VR system power output 392 as shown. System power output 392 may be coupled in one embodiment to electrical load 394 such as a system load (e.g., processing devices, cooling fans, memory devices, storage devices, etc.) of an information handling system, such as server, desktop computer, notebook computer, etc.

In the embodiment of FIG. 5, each of IPstages $200_1$ to $200_N$ also includes Vboot monitor and standby execution logic circuit 310 as well as hibernate mode activation and deactivation logic circuit 312 in addition to the other modules 252, 254 and 256 of the IPstage 250 of FIG. 2. In this embodiment, digital VR controller 502 may be configured to be capable of managing standby and/or hibernate modes of IPstage/s 200.

Further information on VR systems and digital VR controllers may be found in U.S. Pat. No. 7,999,520 and in U.S. patent application Ser. No. 13/768,357, filed Feb. 15, 2013, each of which is incorporated herein by reference in its entirety. In one exemplary embodiment, digital VR controller 502 may include a power device identification module that is configured to recognize the identity (e.g., source vendor or supplier of particular IPstage, IPstage model number, IPstage lot number, IPstage date code or other code and/or other identifier information for the particular type of installed IPstage, etc.) of each specific type of IPstage $200_1$ to $200_N$ via a respective power device identification pin signal $208_1$ to $208_N$ that is indicative of the given IPstage identity and that is provided from an ID recognition module of the IPstage (e.g., such as through setting different voltage levels) that may be integrated into each of IPstages 200.

In the embodiment of FIG. 5, Vboot monitor and standby execution circuit 310 may be configured to monitor voltage across the boot capacitor and to compare the monitored boot capacitor voltage to a predetermined VStandBy voltage threshold to determine when the boot capacitor voltage equals or drops below the VStandBy voltage threshold. Such a VStandBy voltage threshold may in one embodiment be, for example, about 4.5V or any other suitable greater or lesser voltage value in other embodiments. Upon determination that the boot capacitor voltage is equal or below the VStandBy voltage threshold, Vboot monitor and standby execution circuit 310 may be configured to place its IPstage 200 into IPstage standby mode by turning off a portion or all features of high frequency current sense/calibration module 254. Still referring to FIG. 5, hibernate mode activation and deactivation logic circuit 312 may include a power device identification detector circuit and a driver logic interface 311 with driver logic module 252, and may be configured to activate an IPstage hibernate (deep sleep) mode in response to a control signal received from VR controller 502, e.g., based on a host information handling system standby command received by VR controller 502.

Figure 6:
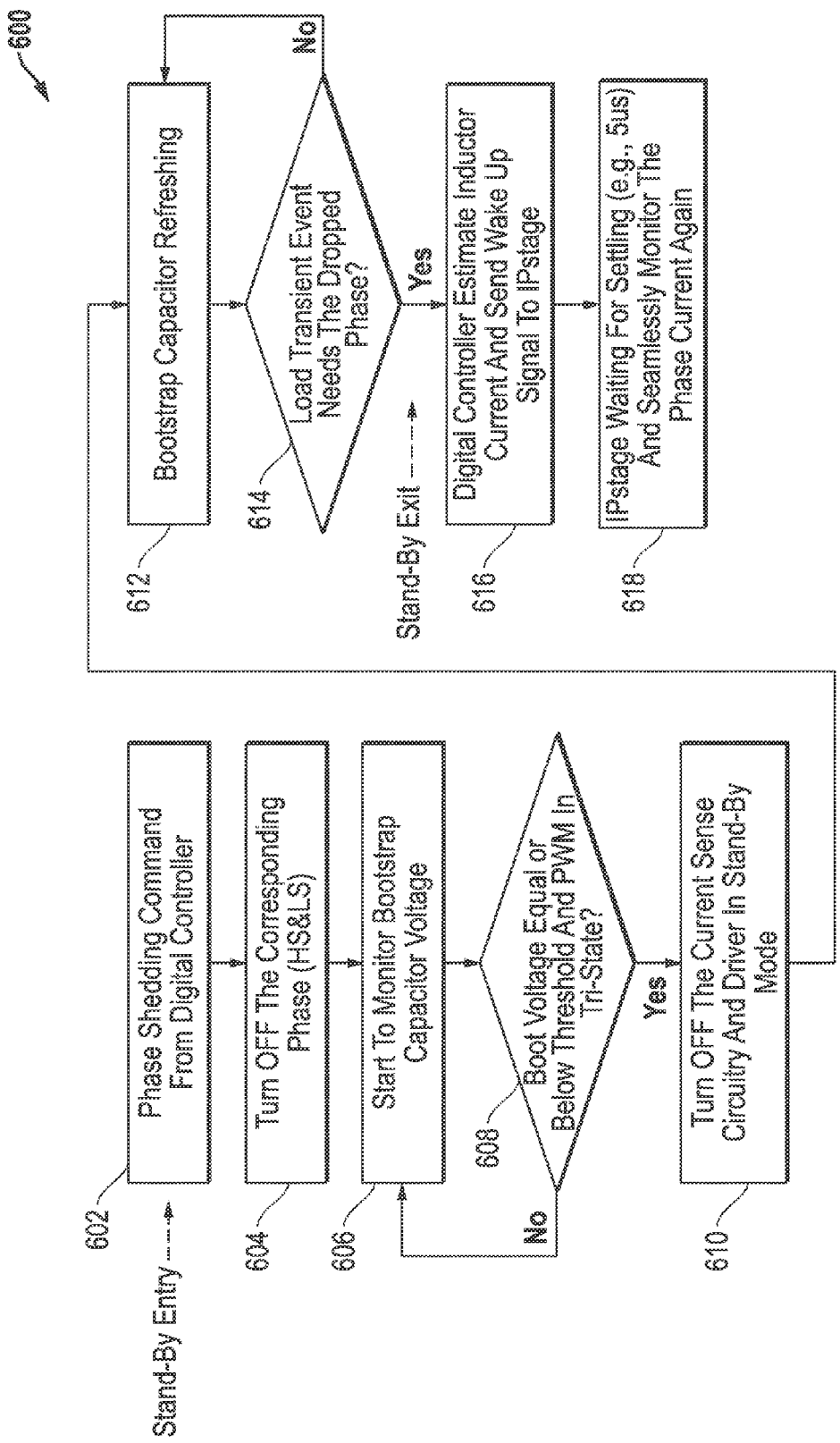
FIG. 6 illustrates a flowchart of methodology that may be employed to enter and exit IPstage stand-by mode operation according to one exemplary embodiment of the disclosed methods and systems.

FIG. 6 is a flow chart illustrating one exemplary embodiment of methodology 600 that may be employed to enter and exit IPstage stand-by mode operation for one or more individual IPstage/s 200 of FIG. 5. As shown in FIG. 6, a given IPstage 200 receives a phase shedding command in step 602 from digital VR controller 502 which may occur in response to reduced information handling system load. An integrated processing device (e.g., executing driver logic module 252) within the given IPstage 200 responds in step 604 by turning off its HS and LS FETs of half-bridge power module 256 to drop the given IPstage 200 and enter the IPstage operating mode, during which the IPstage 200 uses its Vboot monitor and standby execution circuit 310 (e.g., also executed by IPstage integrated processing device) to start monitoring boot capacitor voltage in step 606. Once boot voltage is detected by circuit 310 in step 608 to drop to be equal or below the predetermined VStandBy voltage threshold while in PWM tri-state mode, then Vboot monitor and standby execution circuit 310 turns off current-sense and calibration circuitry features of circuit module 254 and sets the IPstage driver 252 in standby mode in step 610. Meanwhile, in step 612 optional boot voltage refresh scheme previously described is implemented to maintain boot voltage in the desired refresh range as indicated in FIG. 4.

As further shown in FIG. 6, VR controller may monitor system load status and continue optional bootstrap refresh step 612 as shown until IPstage standby mode is exited when PWM signal status is changed from tri-state to high or low such as when VR controller 502 detects in step 614 that a system load step up event has occurred that now requires the dropped IPstage 200, and digital VR controller 502 sends a wakeup signal in step 616 to the dropped IPstage 200. In step 616, VR controller 502 may also estimate inductor current at this time since IPstage current sense is still not settled at this point. In response, IPstage driver 252 and the internal current-sensing and calibration circuits of module 254 of the dropped IPstage 200 begin to wake up in step 618, and high side (HS) and low side (LS) FETs of half-bridge power module 256 are turned on when IPstage 200 wakes up. In step 618, module 254 restarts real-time phase current monitoring again after an optional settling time, e.g., from about 3 us to about 5 us, or other suitable greater or lesser time to allow for accurate output values. Real-time IPstage phase current may be estimated in one embodiment by digital VR controller 502 during this settling time. In this regard, inductor current is zero after the IPstage driver 252 and high side/low side FETS of half-bridge power module 256 are turned off in step 610. When digital VR controller 502 sends a wakeup signal (e.g., PWM) in step 616 to the shedded IPstage 200, VR controller 502 knows the high side FET ON time and low side FET ON time as well as Vout, Vin and $L_O$ inductance value. From this information, inductor current profile may be iteratively calculated in one exemplary embodiment by VR controller 502 using the following two equations (e.g., for the exemplary embodiment of FIG. 3 based on IPstage Vout and Vin):

$$\Delta I_{L1}(t) = \frac{1}{L}(v_{in} - v_{out}) \times t$$

$$\Delta I_{L2}(t) = -\frac{1}{L} v_{out} \times t$$

in which:
$\Delta I_{L1}$ is inductor current change from the previous inductor current during a given high side FET "on" time;
$\Delta I_{L2}$ is inductor current change from previous inductor current during a given low side FET on time;
t is duration of the present PWM high or low cycle;
L is inductance of inductor $L_O$.

It will be understood that one or more IPstage phases 200 of a VR system may be controlled to enter and/or exit an IPstage standby operation mode while other IPstage phases 200 continue operating in non-standby active regulation operation mode, e.g., as needed to tailor VR system power supply capacity to changing load and/or power shedding.

Figure 7:
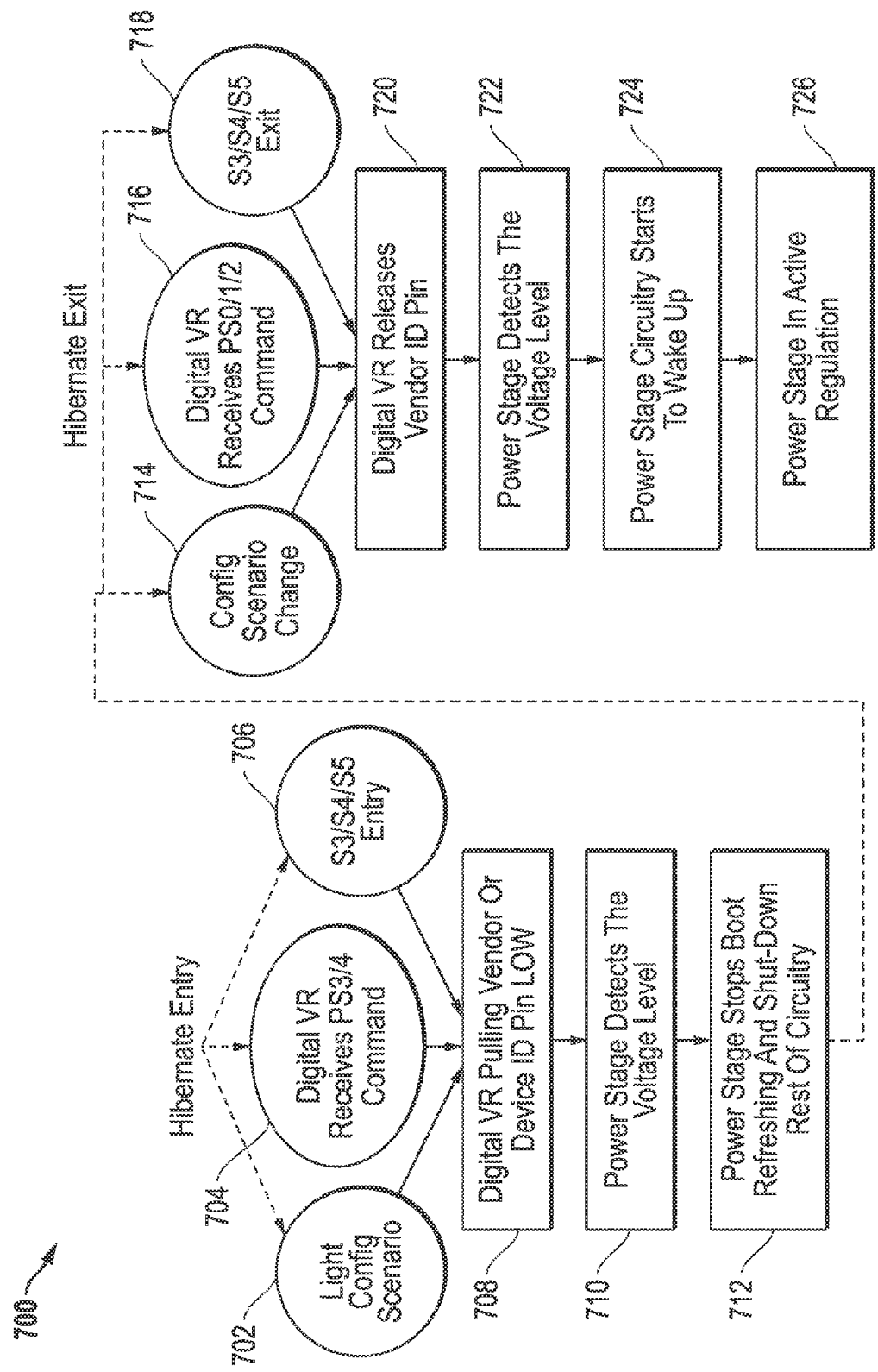
FIG. 7 illustrates a flowchart of methodology that may be employed to enter and exit IPstage hibernate mode operation according to one exemplary embodiment of the disclosed methods and systems.

FIG. 7 is a flow chart illustrating one exemplary embodiment of methodology 700 that may be employed to enter and exit IPstage hibernate mode for one or more individual IPstage phases 200, e.g., when multi-phase VR system 500 is employed to power an information handling system such as a server. It will be understood that one or more IPstage phases 200 of a VR system may be controlled to enter and/or exit an IPstage hibernation mode while other IPstage phases 200 remain in non-hibernating active regulation operation mode, e.g., as needed to tailor VR system power supply capacity to changing information handling system load, status and/or state.

In the exemplary embodiment of FIG. 7, an IPstage hibernate mode may be initiated by VR controller 502 in response to receipt of particular command/s from a host system CPU processor or other detection of change in information handling system operation load, status and/or state. Examples of information handling system events that may be used to trigger entry into IPstage hibernate mode include, but are not limited to: 1) Digital VR controller 502 receives a microprocessor power state PS3 or PS4 command in step 704; 2) PMBus command optimal light load configuration in step 702 (e.g., where lower power CPU requires fewer operating IPstage phases); 3) system ACPI S3, S4 or S5 entry in step 706; it being understood that occurrence of other additional and/or alternative conditions may be utilized to initiate an IPstage hibernate mode for a given IPstage/s 200. As shown in FIG. 7, digital VR controller 502 may initiate the IPstage hibernate mode for a given IPstage 200 in step 708 by providing a hibernation activation signal to the IPstage 200. Such a hibernation activation signal may be any suitable separate signal that is recognized by the IPstage for initiating hibernation mode. In one exemplary embodiment, a digital VR controller 502 may initiate the IPstage hibernate mode by pulling its corresponding device ID interface 208 low, a condition which is detected by the given IPstage 200 in step 710 (e.g., by an integrated processing device within IPstage 200). The given IPstage 200 (e.g., using hibernate mode activation and deactivation logic circuit 312 executed by an integrated processing device within IPstage 200) may respond by entering the IPstage hibernate mode in step 712, in this case turning off all IPstage circuits except top level enable signal (EN) and ID logic so as to continue monitoring device ID interface 208 once IPstage hibernate mode is set, and by disabling Vboot refresh so that the boot capacitor is not refreshed during the duration of the IPstage hibernate mode.

Still referring to FIG. 7, methodology 700 may exit the IPstage hibernate mode when digital VR controller 502 receives particular command/s from a host system CPU processor or other detection of change in information handling system state such as: 1) Digital VR controller 502 receives a microprocessor power state PS0, PS1, or PS2 command in step 716; 2) PMBus command optimal configuration scenario change (e.g., to heavier load) in step 714; 3) system ACPI S3, S4 or S5 exit in step 718; it being understood that occurrence of other additional and/or alternative conditions may be utilized to exit an IPstage hibernate mode. As shown in FIG. 7, digital VR controller 502 may initiate exit of the IPstage hibernate mode for a given IPstage 200 by providing a hibernation deactivation signal to the IPstage 200. Such a hibernation deactivation signal may be any suitable separate signal that is recognized by the IPstage for initiating hibernation mode. For example, in one exemplary embodiment, a digital VR controller 502 may initiate the IPstage hibernate mode by releasing its corresponding device ID interface 208 high in step 720. The given IPstage 200 (e.g., using hibernate mode activation and deactivation logic circuit 312 executed by an integrated processing device within IPstage 200) may then detect high voltage level on the device ID interface 208 in step 724 and respond by waking up and returning to active regulation in step 726.

It will be understood that communication between digital VR controller 502 and each given IPstage 200 may be implemented in different ways. For example, as described above, device ID pin 208 can be used to implement bi-directional communication between VR controller 502 and a given IPstage 200. In such an embodiment, IPstage ID may be read and recognized by digital controller 502 during initialization, in this case IPstage 200 is an ID signal sender while digital controller 502 is an ID signal receiver. After initialization, digital controller 502 may be configured to change to a hibernate mode signal sender while each given IPstage 200 becomes a hibernate mode signal receiver, with VR controller 502 having an individual ID pin 208 for each IPstage phase 200. However, any other suitable manner of signal communication between VR controller 502 and IPstage phases 200 may be employed.

Figure 8:
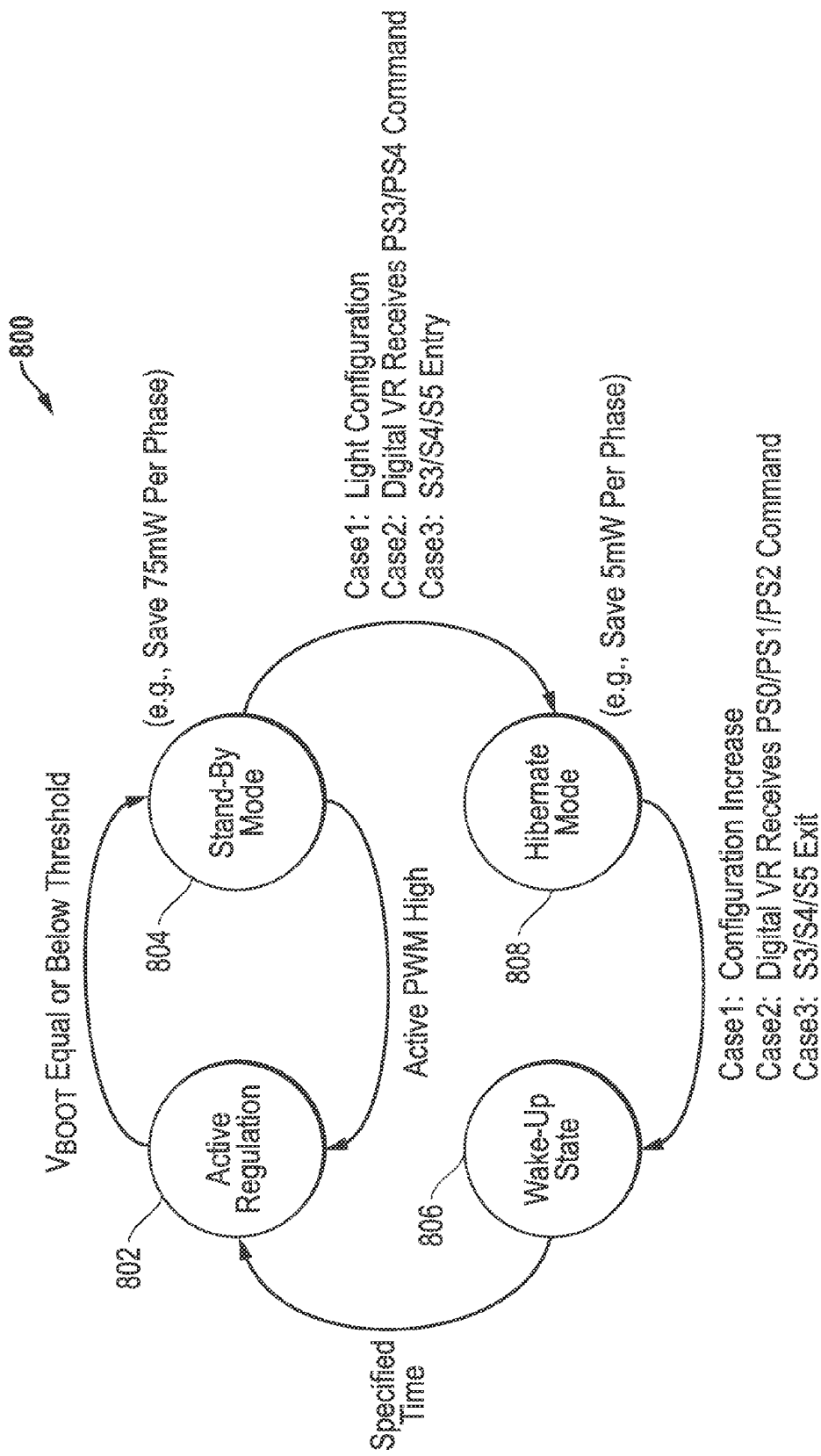
FIG. 8 illustrates state transition between IPstage operation modes according to one exemplary embodiment of the disclosed methods and systems.

FIG. 8 illustrates one exemplary embodiment 800 of state transition between IPstage operation modes for a given IPstage phase 200 of a multi-phase VR system 500, e.g., such as described above in relation to FIGS. 6 and/or 7. As shown, the given IPstage phase 200 enters IPstage standby mode 804 from active regulation mode 802 when Vboot voltage reaches the preset or predetermined VStandBy threshold. In one example about 75 mW of power per stage is saved compared to power consumption during active regulation mode 802, although power savings may be more or less depending on the specific circuit and/or system configuration of a given embodiment. When entry criteria for IPstage hibernate mode is met (e.g., light configuration, digital VR receives microprocessor PS3 or PS4 command; ACPI S3, S4 or S5 Entry), the given IPstage 200 is forced into IPstage hibernate mode 808, e.g., saving an additional 5 mW of power per stage as compared to power consumption during stand-by mode 804, although power savings may be more or less depending on the specific circuit and/or system configuration of a given embodiment. IPstage 200 exits hibernate mode 808 and enters wakeup transition mode 806 when exit criteria is met (e.g., configuration increase, digital VR receives microprocessor PS0, PS1 or PS2 command; ACPI S3, S4 or S5 Exit) when system operation status is changed as shown. Then, after an optional pre-specified time (e.g. such as from about 1 ms to about 2 ms or other suitable greater or lesser time), IPstage 200 then transitions to active operation mode 802. Similarly, in this embodiment, IPstage standby mode 804 may be directly exited to active regulation mode 802 when PWM signal becomes active high, such as when more active IPstage phases 200 are needed for operation of VR system 500.

It will be understood that the particular number and sequence of steps of methodologies 600 and 700 (as well as the particular number and relation of state transitions between IPstage operation modes of FIG. 8) are exemplary only, and that any other combination and/or sequence of fewer, additional, and/or alternative steps or state transitions that are suitable for improving efficiency of smart IPstages of multiphase VR systems while operating under relatively light, ultra-light, or partial or reduced loads for a VR system.

It will be understood that one or more of the tasks, functions, or methodologies described herein (e.g., including those described for VR controller 502 and/or driver logic module or processing device of a given IPstage 200) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system, comprising:
   at least one integrated power stage (IPstage) comprising an IPstage processing device, power-consuming circuitry, and a power output;
   where the power output of the IPstage is configured to be coupled to a bootstrap capacitor;
   where the IPstage is configured to be coupled to receive signals from a separate processing device configured as a voltage regulator (VR) controller that command the IPstage to selectively provide or not provide power to the power output of the IPstage; and
   where the IPstage processing device is configured to:
   monitor voltage on the bootstrap capacitor while the IPstage is commanded by a coupled VR controller to not provide power to the power output of the IP stage, enter an IPstage stand-by mode by turning off at least a first portion of the power-consuming circuitry of the IPstage when the monitored voltage of a coupled bootstrap capacitor becomes less than or equal to a pre-determined standby voltage ($V_{standBy}$) threshold value while the IPstage is not providing power to the power output of the IPstage in response to a command from the VR controller, and
   then exit the stand-by mode by turning on the at least first portion of the power-consuming circuitry of the IPstage when the IPstage receives a command from the VR controller to provide power to the power output of the IPstage.

2. The system of claim 1, where the power-consuming circuitry of the IPstage comprises at least one of current sense circuitry configured to sense output current from the IPstage power output, half-bridge power circuitry configured to provide output power to the IPstage power output, gate driver circuitry configured to drive the half-bridge power circuitry, or a combination thereof.

3. The system of claim 1, where the IPstage processing device is configured to:
   monitor voltage on the bootstrap capacitor while the IPstage is commanded by the VR controller to not provide power to the power output of the IP stage; and
   control at least a second portion of the power-consuming circuitry of the IPstage to supply current to the bootstrap capacitor to increase voltage on the bootstrap capacitor when the monitored voltage of the bootstrap capacitor becomes less than or equal to a pre-determined refresh voltage ($V_{bootMin}$) threshold value while the IPstage processing device is not providing power to the power output of the IPstage;
   where the $Y_{bootMin}$ threshold value is less than the $V_{standBy}$ threshold value.

4. The system of claim 3, where the IPstage processing device is configured to:
   control the at least second portion of the power-consuming circuitry of the IPstage to supply current to the bootstrap capacitor to increase voltage on the bootstrap capacitor when the monitored voltage of the bootstrap capacitor becomes less than or equal to a pre-determined refresh voltage ($V_{bootMin}$) threshold value while the IPstage processing device is not providing power to the power output of the IPstage; and
   then control the at least second portion of the power-consuming circuitry of the IPstage to stop supplying current to the bootstrap capacitor when the monitored voltage of the bootstrap capacitor increases to greater than or equal to pre-determined maximum Vboot Refresh ($V_{bootMax}$) threshold value while the IPstage processing device is not providing power to the power output of the IPstage.

5. The system of claim 3, where the IPstage is further configured to receive a hibernation activation signal from the VR controller controller; and where the IPstage processing device is configured to respond to the hibernation activation signal and enter an IPstage hibernation mode by turning off at least the second portion of the power-consuming circuitry of the IPstage in addition to the first portion of the power-consuming circuitry of the IPstage such that the bootstrap capacitor is not refreshed during the duration of the IPstage hibernation mode.

6. The system of claim 5, where the IPstage is further configured to receive a hibernation deactivation signal from the VR controller controller; and where the IPstage processing device is configured to respond to the hibernation deactivation signal and exit the IPstage hibernation mode to an active power regulation mode by turning on the first and second portions of the power-consuming circuitry of the IPstage.

7. The system of claim 6, where the IPstage is configured to be coupled to the VR controller by a bi-directional power device identification signal path that is configured to communicate signals between the IPstage and the VR controller that are indicative of the identity of the IPstage; and where the IPstage is further configured to recognize a first signal on the power device identification signal path from the VR controller controller as the hibernation activation signal; and to recognize a second signal on the power device identification signal path from the VR controller controller as the hibernation deactivation signal.

8. The system of claim 3, where the at least first portion of the power-consuming circuitry comprises the current sense circuitry; where the at least second portion of the power-consuming circuitry of the IPstage of the IPstage comprises at least a portion of half-bridge power circuitry configured to provide output power to the IPstage power output; and where the IPstage processing device is configured to control the at least a portion of the half-bridge power circuitry of the IPstage to supply current to the bootstrap capacitor to increase voltage on the bootstrap capacitor when the monitored voltage of the bootstrap capacitor becomes less than or equal to the pre-determined refresh voltage ($V_{bootMin}$) threshold value while the IPstage processing device is not providing power to the power output of the IPstage.

9. A method of operating a voltage regulator (VR) system that includes at least one processing device, comprising:
using the at least one processing device as a voltage regulator (VR) controller to control operation of at least one integrated power stage (IPstage) of the VR system, the IPstage having a separate IPstage processing device, power-consuming circuitry, and a power output that is coupled to a bootstrap capacitor;
using the VR controller to provide signals to the IPstage to command the IPstage to selectively provide or not provide power to the power output of the IPstage; and
using the IPstage processing device to:
monitor voltage on the bootstrap capacitor while the IPstage is commanded by the VR controller to not provide power to the power output of the IP stage,
enter an IPstage stand-by mode by turning off at least a first portion of the power-consuming circuitry of the IPstage when the monitored voltage of a coupled bootstrap capacitor becomes less than or equal to a pre-determined standby voltage ($V_{standBy}$) threshold value while the IPstage is not providing power to the power output of the IPstage in response to a command from the VR controller, and
then exit the stand-by mode by turning on the at least first portion of the power-consuming circuitry of the IPstage when the IPstage receives a command from the VR controller to provide power to the power output of the IPstage.

10. The method of claim 9, where the power-consuming circuitry of the IPstage comprises at least one of current sense circuitry configured to sense output current from the IPstage power output, half-bridge power circuitry configured to provide output power to the IPstage power output, gate driver circuitry configured to drive the half-bridge power circuitry, or a combination thereof.

11. The method of claim 9, further comprising using the IPstage processing device to:
monitor voltage on the bootstrap capacitor while the IPstage is commanded by the VR controller to not provide power to the power output of the IP stage; and
control at least a second portion of the power-consuming circuitry of the IPstage to supply current to the bootstrap capacitor to increase voltage on the bootstrap capacitor when the monitored voltage of the bootstrap capacitor becomes less than or equal to a pre-determined refresh voltage ($Y_{bootMin}$) threshold value while the IPstage processing device is not providing power to the power output of the IPstage;

where the $V_{bootMin}$ threshold value is less than the $V_{standBy}$ threshold value.

12. The method of claim 11, further comprising using the IPstage processing device to:
control the at least second portion of the power-consuming circuitry of the IPstage to supply current to the bootstrap capacitor to increase voltage on the bootstrap capacitor when the monitored voltage of the bootstrap capacitor becomes less than or equal to a pre-determined refresh voltage ($Y_{bootMin}$) threshold value while the IPstage processing device is not providing power to the power output of the IPstage; and
then control the at least second portion of the power-consuming circuitry of the IPstage to stop supplying current to the bootstrap capacitor when the monitored voltage of the bootstrap capacitor increases to greater than or equal to pre-determined maximum Vboot Refresh ($V_{bootMax}$) threshold value while the IPstage processing device is not providing power to the power output of the IPstage.

13. The method of claim 11, further comprising providing a hibernation activation signal from the VR controller controller to the IPstage; and using the IPstage processing device to respond to the hibernation activation signal and enter an IPstage hibernation mode by turning off at least the second portion of the power-consuming circuitry of the IPstage in addition to the first portion of the power-consuming circuitry of the IPstage such that the bootstrap capacitor is not refreshed during the duration of the IPstage hibernation mode.

14. The method of claim 13, further comprising providing a hibernation deactivation signal from the VR controller controller to the IPstage; and using the IPstage processing device to respond to the hibernation deactivation signal and exit the IPstage hibernation mode to an active power regulation mode by turning on the first and second portions of the power-consuming circuitry of the IPstage.

15. The method of claim 14, where the IPstage is coupled to the VR controller by a bi-directional power device identification signal path; and where the method further comprises:
communicating signals between the IPstage and the VR controller that are indicative of the identity of the IPstage; and
providing a first signal on the power device identification signal path from the VR controller controller to the IPstage as the hibernation activation signal; and
providing a second signal on the power device identification signal path from the VR controller controller to the IPstage as the hibernation activation signal.

16. The system of claim 11, where the at least first portion of the power-consuming circuitry comprises the current sense circuitry; where the at least second portion of the power-consuming circuitry of the IPstage of the IPstage comprises at least a portion of half-bridge power circuitry configured to provide output power to the IPstage power output; and where the method further comprises using the IPstage processing device to control the at least a portion of the half-bridge power circuitry of the IPstage to supply current to the bootstrap capacitor to increase voltage on the bootstrap capacitor when the monitored voltage of the bootstrap capacitor becomes less than or equal to the pre-determined refresh voltage ($V_{bootMin}$) threshold value while the IPstage processing device is not providing power to the power output of the IPstage.

17. A voltage regulator (VR) system, comprising:
at least one integrated power stage (IPstage) comprising an IPstage processing device, power-consuming circuitry, and a power output coupled to a bootstrap capacitor;

at least one processing device configured as a VR system controller coupled to control the IPstage to selectively provide or not provide power to the power output of the IPstage; and where the IPstage processing device is configured to:
monitor voltage on the bootstrap capacitor while the IPstage is controlled by the VR controller to not provide power to the power output of the IP stage,
enter an IPstage stand-by mode by turning off at least a first portion of the power-consuming circuitry of the IPstage when the monitored voltage of a coupled bootstrap capacitor becomes less than or equal to a pre-determined standby voltage ($V_{standBy}$) threshold value while the IPstage is controlled to not provide power to the power output of the IPstage by the VR controller, and
then exit the stand-by mode by turning on the at least first portion of the power-consuming circuitry of the IPstage when the IPstage is controlled by the VR controller to provide power to the power output of the IPstage.

18. The system of claim 17, where the IPstage processing device is configured to:
monitor voltage on the bootstrap capacitor while the IPstage is commanded by the VR controller to not provide power to the power output of the IP stage; and
control at least a second portion of the power-consuming circuitry of the IPstage to supply current to the bootstrap capacitor to increase voltage on the bootstrap capacitor when the monitored voltage of the bootstrap capacitor becomes less than or equal to a pre-determined refresh voltage ($V_{bootMin}$) threshold value while the IPstage processing device is not providing power to the power output of the IPstage;
where the $V_{bootMin}$ threshold value is less than the $V_{standBy}$ threshold value.

19. The system of claim 18, where the IPstage processing device is configured to:
control the at least second portion of the power-consuming circuitry of the IPstage to supply current to the bootstrap capacitor to increase voltage on the bootstrap capacitor when the monitored voltage of the bootstrap capacitor becomes less than or equal to a pre-determined refresh voltage ($V_{bootMin}$) threshold value while the IPstage processing device is not providing power to the power output of the IPstage; and
then control the at least second portion of the power-consuming circuitry of the IPstage to stop supplying current to the bootstrap capacitor when the monitored voltage of the bootstrap capacitor increases to greater than or equal to pre-determined maximum Vboot Refresh ($V_{bootMax}$) threshold value while the IPstage processing device is not providing power to the power output of the IPstage.

20. The system of claim 18, where the VR controller is further configured to provide a hibernation activation signal to the IPstage; where the IPstage processing device is configured to respond to the hibernation activation signal and enter an IPstage hibernation mode by turning off at least the second portion of the power-consuming circuitry of the IPstage in addition to the first portion of the power-consuming circuitry of the IPstage such that the bootstrap capacitor is not refreshed during the duration of the IPstage hibernation mode; where the VR controller is further configured to provide a hibernation deactivation signal to the IPstage; and where the IPstage processing device is configured to respond to the hibernation deactivation signal and exit the IPstage hibernation mode to an active power regulation mode by turning on the first and second portions of the power-consuming circuitry of the IPstage.

21. The system of claim 17, where the VR controller being configured to:
first control the IPstage to selectively not provide power to the power output of the IPstage by sending a phase-shedding command signal to the IPstage; and
then control the IPstage to selectively provide power to the power output of the IPstage by sending a wakeup command signal to the IPstage.

* * * * *

UNITED STATES PATENT AND TRADEMARK OFFICE
CERTIFICATE OF CORRECTION

PATENT NO. : 9,240,722 B2
APPLICATION NO. : 14/470344
DATED : January 19, 2016
INVENTOR(S) : Shiguo Luo et al.

It is certified that error appears in the above-identified patent and that said Letters Patent is hereby corrected as shown below:

IN THE CLAIMS

In claim 4, column 12, line 40, delete "to pre-determined" and insert --to a pre-determined--

In claim 12, column 14, line 18, delete "to pre-determined" and insert --to a pre-determined--

In claim 16, column 14, line 50, delete "system" and insert --method--

In claim 19, column 16, line 11, delete "to pre-determined" and insert --to a pre-determined--

Signed and Sealed this
Nineteenth Day of April, 2016

Michelle K. Lee
*Director of the United States Patent and Trademark Office*